April 14, 1959 J. R. OISHEI 2,881,462
WINDSHIELD WIPER CONTROL MEANS
Filed July 20, 1953 3 Sheets-Sheet 1
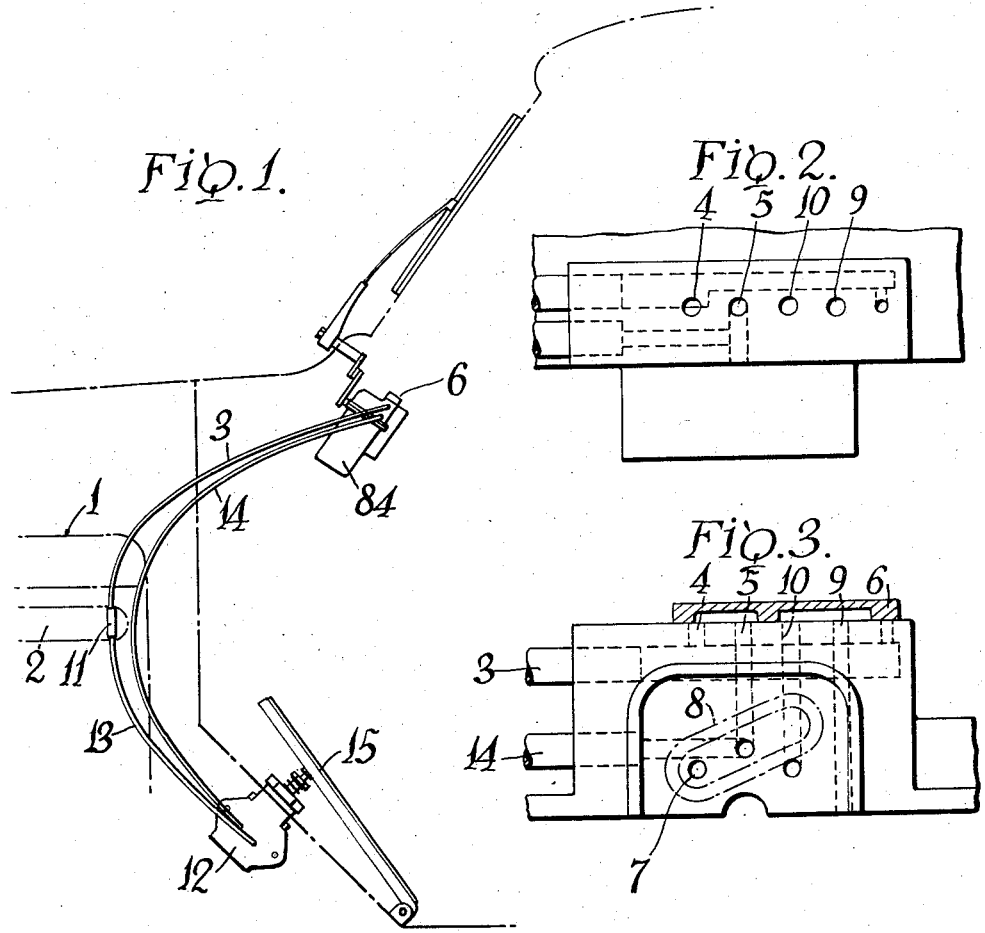
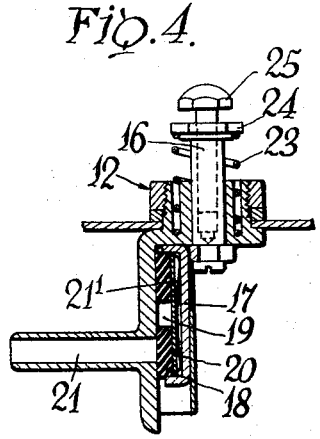
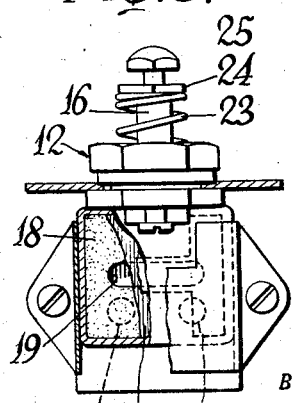
INVENTOR.
John R. Oishei,
BY
Beau, Brooke, Buckley & Beau,
ATTORNEYS April 14, 1959     J. R. OISHEI     2,881,462
WINDSHIELD WIPER CONTROL MEANS
Filed July 20, 1953     3 Sheets—Sheet 2
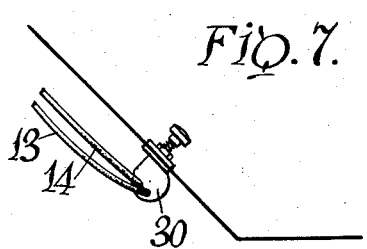
Fig.7.
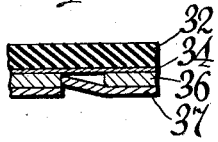
Fig.12.
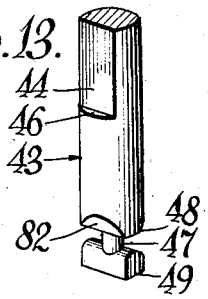
Fig.13.
Fig.11.
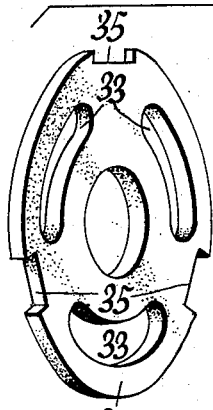
Fig.8.
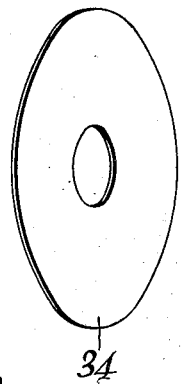
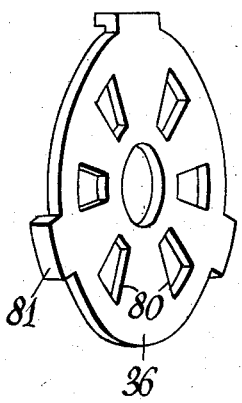
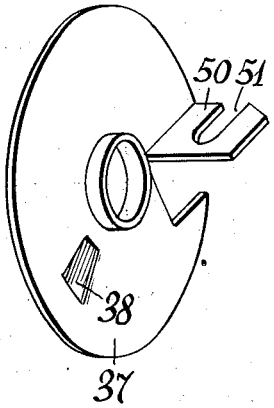
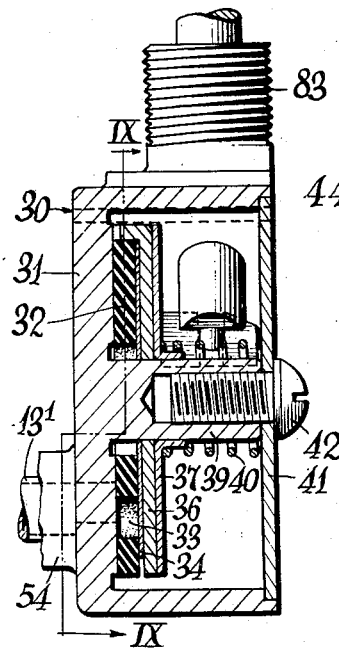
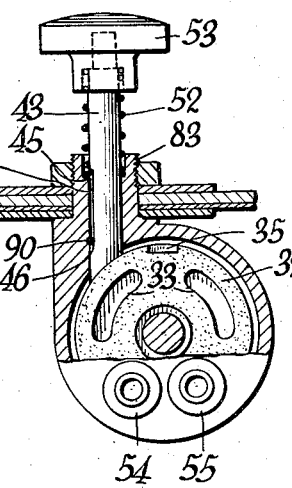
Fig.9.
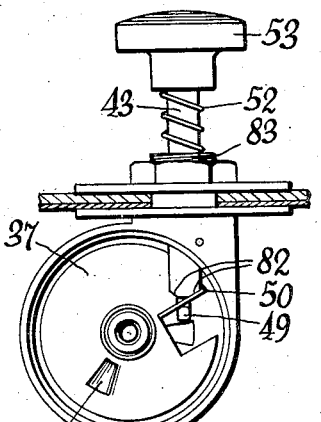
Fig.10.
INVENTOR.
John R. Oishei,
BY
Beau, Brooks, Buckley & Beau,
ATTORNEYS.

April 14, 1959  J. R. OISHEI  2,881,462
WINDSHIELD WIPER CONTROL MEANS
Filed July 20, 1953  3 Sheets-Sheet 3
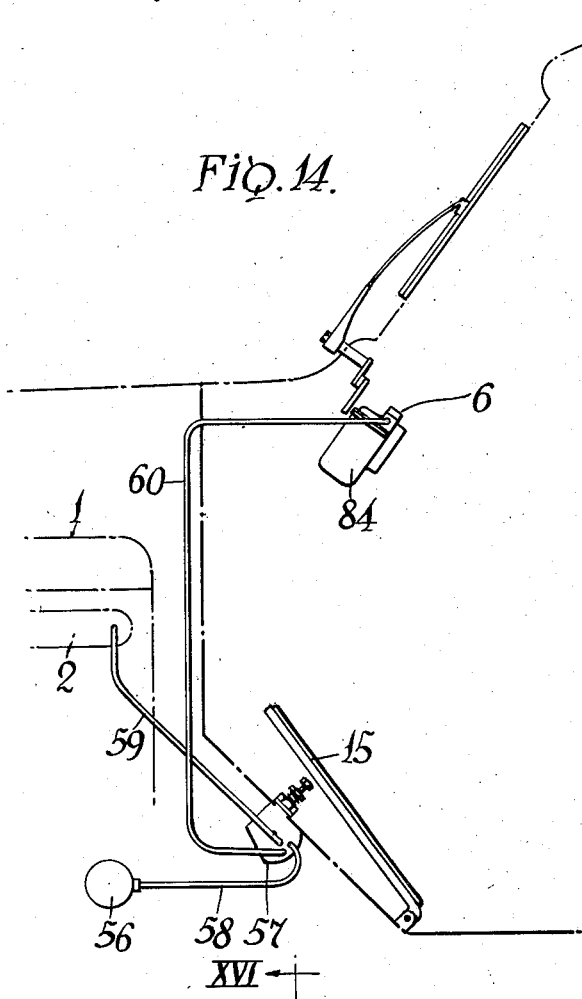
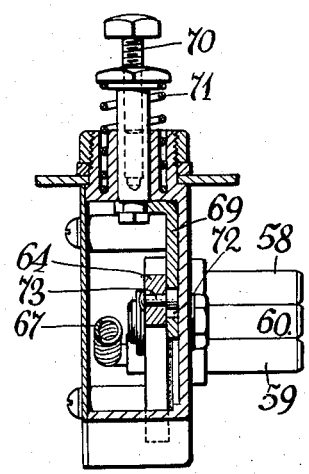
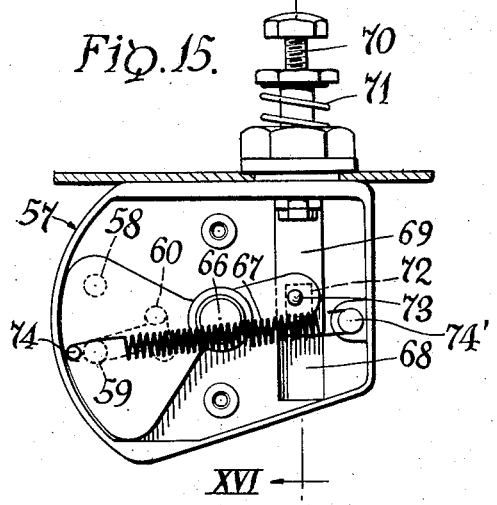
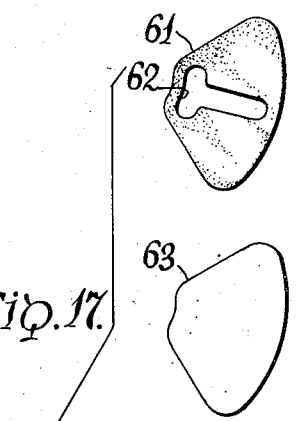
INVENTOR.
John R. Oishei,
BY
Beau, Brooks, Buckley & Beau,
ATTORNEYS.

United States Patent Office 2,881,462
Patented Apr. 14, 1959

2,881,462

WINDSHIELD WIPER CONTROL MEANS

John R. Oishei, Buffalo, N.Y., assignor to Trico Products Corporation, Buffalo, N.Y.

Application July 20, 1953, Serial No. 369,031

15 Claims. (Cl. 15—253)

This invention relates to a novel system whereby the vacuum available to a fluid motor may be temporarily supplemented for transient conditions of acceleration.

The volume in space through which the windshield of a motor vehicle passes in any given unit of time is a function of the velocity of the vehicle. If the weather is inclement the amount of rain within this volume is a function of the intensity of the downpour. Therefore, the rate at which the windshield becomes obliterated due to the impingement of droplets of rain upon it is a function of the velocity of the vehicle and of the intensity of the downpour. In windshield wiper units of conventional design, the rate at which the blade oscillates may be manually controlled by throttling the control valve in the line between the intake manifold of the engine and the fluid motor of the wiper unit. Hence, the operator of the vehicle may adjust the rate of oscillation of the blade to suit his individual needs, employing a high rate of oscillation if the vehicle is traveling at a rapid rate or a lower rate of oscillation if the velocity of the vehicle is low. These manual control means are adequate so long as the conditions under which the vehicle is being operated remain constant. If some transient condition arises during which it is necessary to accelerate, as when attempting to pass another vehicle, the rate at which the wiper blade oscillates does not change, since it is substantially unresponsive to changes in the velocity of the vehicle. But, the rate at which the windshield is becoming obliterated increases directly with the increased velocity. The wiper being adjusted to the lower velocity cannot adequately clean the windshield which as a result remains partially obscured, impairing the operator's vision at the very time maximum visibility is needed most. It would be possible for the operator to temporarily readjust the manual throttle for the transient acceleration, but this is undesirable as it would distract his attention from the road, and as a practical matter since the condition is temporary, the average operator would not bother to readjust the throttle, preferring to subject himself to the impaired visibility and increased danger of accident resulting therefrom.

Accordingly, it is an object of this invention to provide a system whereby the rate of oscillation of the wiper blades may be varied with facility.

Another object of the invention is to provide means whereby the rate of oscillation of the wiper blades may be increased automatically.

A further object of the invention is to provide means whereby the vacuum available to the fluid motor of the windshield wiper unit may be increased automatically.

For a better understanding of these and other objects of the invention, reference is made to the following specifications and accompanying drawings wherein:

Fig. 1 is a schematic representation of one form of the invention installed in an automobile;

Fig. 2 is a plan view of the control valve of the fluid motor with the speed regulating valve removed;

Fig. 3 is a side elevation of the control valve;

Fig. 4 is a sectional side elevation of the auxiliary valve showing the details thereof;

Fig. 5 is a rear elevational view of the auxiliary valve, partly in section;

Fig. 6 illustrates a detail of the auxiliary valve;

Fig. 7 illustrates a modified form of the invention;

Fig. 8 is a side elevational view in section of the auxiliary valve;

Fig. 9 is a front elevational view of the auxiliary valve taken on line IX—IX of Fig. 8 to a reduced scale;

Fig. 10 is a rear elevational view of the auxiliary valve with the housing removed;

Fig. 11 is an exploded view of the auxiliary valve mechanism;

Fig. 12 illustrates a detail of the auxiliary valve mechanism;

Fig. 13 is a detailed view of a portion of the auxiliary plunger;

Fig. 14 is a schematic representation of another modified form of the invention;

Fig. 15 is a side elevational view of the auxiliary valve with the cover plate removed;

Fig. 16 is a sectional view of the auxiliary valve taken in line XVI—XVI of Fig. 15; and Fig. 17 is an exploded view of the auxiliary valve mechanism.

Like reference numerals refer to like elements throughout.

Referring more particularly to the drawings, the numeral 1 generally designates the engine of an automobile shown in phantom section, and 2 represents the intake manifold thereof. Hose 3 connects the intake manifold to the main port 4 in the casing of the control valve of the windshield wiper fluid motor 84. As shown in Fig. 3, port 4 is connected to port 5 via speed regulating valve 6. In the position shown, port 5 is connected to port 7 via kidney valve 8. Port 7 opens directly into the left side of the pressure chamber of the fluid motor as is conventional. Port 9 connects the right side of the pressure chamber to port 10 via speed regulating valve 6. Port 10 in the position shown is open to the atmosphere. In the normal cycle of operation air is withdrawn from the left side of the pressure chamber by the intake manifold of the engine via port 7, kidney valve 8, port 5, speed regulating valve 6, port 4, hose 3 and T-connection 11. Atmospheric pressure is maintained on the right side of the pressure chamber via port 10, speed regulating valve 6 and port 9. Because of the pressure differential existing between the two sides of the chamber, the paddle, not shown, is forced to move in a clockwise direction. As the paddle approaches the end of its stroke, it actuates the kidney valve 8 by conventional means to inter-connect ports 5 and 10 and open port 7 to the atmosphere. In the second half cycle, air is withdrawn from the right side of the pressure chamber via port 9, speed regulating valve 6, port 10, kidney valve 8, port 5, speed regulating valve 6, port 4, hose 3, T-connection 11 and intake manifold 2. The left side of the chamber is maintained at atmospheric pressure via port 7. As a result the paddle is now caused to move in a counterclockwise direction. As the paddle approaches the end of its stroke, it actuates kidney valve 8, moving it back to the position illustrated, and the cycle recommences.

The cycles per unit time are determined by the rate at which air is withdrawn from the left or right side of the pressure chamber. The rate of withdrawal, and therefore the cycles per unit time, is controlled by throttling port 4, through the utilization of speed regulating valve 6. Throttling is accomplished by shifting valve 6 to the right, thereby restricting port 4 and the free flow of air therethrough. Port 4 is illustrated as partially throttled in Fig. 3. A greater or lesser degree of throttling may be attained by moving the speed control valve to the right or left as the case may be. The cycles per unit time will remain substantially constant for a given valve setting.

The present invention contemplates the utilization of a separate by-pass valve to increase the rate of oscillation during transient conditions.

T-connection 11 is connected to auxiliary valve 12 via hose 13. Valve 12 is connected directly to port 5 by hose 14, as illustrated in Fig. 1, thus by-passing port 4.

Valve 12 is located directly under the accelerator pedal 15 on the floor board of the vehicle. When the pedal is depressed spring biased plunger 16 of the auxiliary valve is lowered. The plunger is connected to cage 17, as best illustrated in Fig. 4. Cage 17 contains the auxiliary valve mechanism, as shown in Figs. 4 and 5. The auxiliary valve mechanism consists of a rectangular rubber sheet 18, having a horizontal slot 19 therein. The rubber sheet is backed by a rectangular piece of sheet metal 20 of substantially the same dimensions, in order to seal the rear of slot 19. Spring 21', best illustrated in Fig. 6, is interposed between sheet 20 and cage 17, in order to insure air-tight contact between elements 18 and 20. Hose 13 is connected to nipple 21 and hose 14 to nipple 22. In the position shown, the valve is closed and is normally held in this position by spring 23. When the accelerator pedal 15 is depressed, plunger 16 is lowered against the resistance of the spring and carriages cage 17, and the attendant valve mechanism with it, lowering the slot 19 into alignment with nipples 21 and 22. As a result, hoses 13 and 14 are interconnected via nipple 21, slot 19 and nipple 22. Plunger 16 consists of an internally threaded female member 24, and an externally threaded male member 25. This permits the adjustment of the length of the plunger for the actuation of the valve at a predetermined depression of pedal 15.

Assume the vehicle to be operating under normal conditions, with main port 4 partially throttled by speed regulating valve 6, as illustrated in Fig. 3. As a result, the cycles per unit time of the paddle of the fluid motor is less than maximum. When the vehicle is accelerated, plunger 16 is depressed by pedal 15, opening auxiliary valve 12, and therefore by-passing mainport 4. Air is then withdrawn from the left side of the pressure chamber via port 7, kidney valve 8, port 5, hose 14, auxiliary valve 12, hose 13, and T-connection 11 to intake manifold 2. The right side of the pressure chamber is maintained at atmospheric pressure, as explained above. The cycle of operation of the fluid motor is identical to that of normal operation, with the exception of the fact that main port 4 is by-passed. Maximum vacuum is therefore available to the fluid motor with the resultant increased rate of operation. It should be noted that air may be withdrawn from the pressure chamber via throttled port 4, as well as by-pass valve 12, the air following the path of least resistance.

A modified form of the invention is illustrated in Figs. 7 through 13. In this form of the invention an auxiliary valve 30 is located at the side of rather than under the accelerator pedal, proximate to the headlight dimmer switch. When the operator of the vehicle desires to utilize the maximum available vacuum he depresses the plunger of valve 30. The valve will then remain in the open position until again depressed.

As shown in Fig. 8, valve 30 consists of a casing 31 containing the valve mechanism therein. Rubber disc 32 having three kidney-shaped perforations 33 therein, as best shown in Fig. 11, abuts casing 31. A backing disc 34 engages the rear of the rubber disc substantially sealing that side. Rubber disc 32 has three equi-angularly spaced detents 35 upon the periphery thereof. The diameter of disc 34 is such that it does not overlap detents 35. Ratchet 36 having six equi-angularly spaced depressions, or perforations 80 therein, abuts disc 34, and lugs 81 on the periphery of ratchet 36 engage detents 35 on rubber disc 32, so that rotation of one will effectively cause rotation of the other. Pawl mechanism 37 abuts the opposite side of disc 36 with pawl 38 riding upon the surface of, or in one of the depressions 80 of ratchet 36, as illustrated in Fig. 12. All four discs are co-axially assembled upon shaft 39, which is integral with casing 31. Helical spring 40, co-axial with shaft 39 abuts pawl mechanism 37, and cover plate 41. The cover plate is secured to casing 31 via screw 42. The spring 40 insures a tight engagement between the four elements of the valve mechanism. Plunger 43, illustrated in part in Fig. 13, is substantially cylindrical in shape. One side of the cylinder is under-cut at 44, so as to provide shoulders 45 and 46, as illustrated in Figs. 9 and 13. Plunger 43 is turned to a smaller diameter at its lower end, so as to provide a neck 47 and shoulder 48. Cross member 49 is rigidly mounted transversely on neck 47, so as to be integral therewith. Flange 50 is cut from a portion of pawl mechanism 37 and bent at substantially 90° thereto. The flange has a U-shaped perforation 51 therein. When assembled, neck 47 of plunger 43 passes through perforation 51, with cross member 49 arranged transversely thereto. As a result, the flange is rigidly engaged between cross member 49 and shoulder 48 of plunger 43, as is clearly illustrated in Fig. 10. Shoulder 48 is bevelled as at 82 to allow clearance for the flange. The plunger extends through the floor board of the vehicle and through a boss 83 in the valve casing 31 into engagement with flange 50. Helical spring 52 compressed between a counter-sunk hole in the boss and cap 53 on plunger 43 tends to urge the plunger out of the boss. Dowel pin 90 in the boss acts as a positive stop limiting the outward motion of the plunger. When cap 53 is depressed by the operator's foot, plunger 43 is lowered against the pressure of spring 52 until shoulder 45 engages pin 90. Pawl mechanism 37 positively engaged with the plunger is therefore caused to rotate. The under-cut portion 44 of plunger 43 is of such dimension as to permit a 60° rotation of the pawl mechanism before shoulder 45 engages pin 90. Pawl 38 engages one of the slots 80 of ratchet mechanism 36, carrying the latter with it for the 60° rotation. As rubber disc 32 is engaged with ratchet 36 via detents 35 and lugs 81, the rubber disc is caused to rotate with the ratchet. When the operator releases the pressure on cap 53, spring 52 causes the plunger to move outward until shoulder 46 engages dowel 90. Pawl 38 moves out of depression 80 and across the face of ratchet 36. The ratchet does not rotate with the pawl, because of the resiliency of the latter.

Hoses 13 and 14 are connected to nipples 54 and 55 of the valve housing. Kidney perforations 33, which are spaced 120° apart on disc 32 are of such dimensions that they may interconnect the nipples 54 and 55 when in one position, and will disconnect them when the disc is rotated 60°. The second perforation will connect the two nipples if the disc is rotated another 60°.

In this form of the invention if the operator desires to utilize the full vacuum available, he depresses cap 53 and plunger 43 against the resistance of spring 52. This results in a 60° rotation of the valve mechanism and the inter-connection of nipples 54 and 55. Therefore, the main port 4, as illustrated in Fig. 4, will be by-passed in a manner similar to that discussed above. The valve will remain in this position after the operator releases the pressure on cap 53. When the pressure is released, plunger 52 and cap 53 move up due to the force of spring 52, causing a 60° counter-rotation of pawl mechanism 37. However, due to the resiliency of pawl 38, the ratchet 36 and attendant discs 32 and 34 will not move. When the operator no longer desires to utilize the full vacuum, he again depresses cap 53, causing a further 60° rotation of the valve mechansm and the resultant disconnection of nipples 54 and 55. If at some subsequent time it is again desired to utilize the full vacuum, the cap is again depressed and the next kidney perforation of disc 32 interconnects nipples 54 and 55.

Figs. 14 through 17 illustrate still another form of the invention. Herein a separate pump 56 is employed in place of the intake manifold when a stronger vacuum is desired. Pump 56 is connected to auxiliary valve 57 via hose 58. The intake manifold is connected to the valve via hose 59 and the control valve is connected to the auxiliary valve via hose 60. As is best illustrated in Fig. 17, the valve mechanism consists of a sector of sheet rubber 61, having a T-shaped perforation 62 therein. This member is backed by sheet metal element 63 of substantially the same dimensions. Element 63 is sandwiched between sector 61 and actuating link 64 having spring 65 therein. Spring 65 bears against element 63, in order to insure the existence of an airtight engagement between elements 61 and 63. Actuating link 64 is freely pivoted at its mid-point 66. The large end of link 64 containing element 62 and 63 over-lies the ports connected to hoses 58, 59 and 60. The dimensions of the T-slot 62 are such that within the permissive range of oscillation of the valve mechanism the T-portion will always over-lie the port leading to hose 60. In one position of the mechanism the stem portion of the slot will over-lie the port leading to hose 58, and in the other position of the mechanism, the stem over-lies the port leading to hose 59, as illustrated in Fig. 15. In order to insure a rapid movement of the mechanism from the first position to the second or vice versa, spring 67 is utilized. The valve housing contains a slideway 68 in which slide 69 rides. Slide 69 is integrally connected to plunger 70 which is urged outward by spring 71. Slide 69 contains an under-cut rectangular slot 72 into which pin 73 integral with actuating link 64 extends. Spring 67 is attached to pin 74' integral with the valve casing at one end and to pin 74 rigidly affixed to the actuating link, at its other end. In the position shown in Fig. 15, when plunger 70 is depressed it will move downward until the top of slot 72 engages pin 73, then pin 73 and actuating link 64 integral therewith, will commence to rotate about pivot 66, as the plunger moves downward. As the pin moves past dead-center spring 67 will cause a rapid movement of the link to its second position, because of the lost motion made available by slot 72. The valve mechanism will remain in this position until the pressure on the plunger is released. When the pressure is released, the plunger 70 will tend to move upward, due to the force exerted thereupon by spring 71. When the lower portion of slot 72 engages pin 73, the pin and actuating link will be caused to rotate. One the pin passes its dead-center, the spring will cause rapid movement to the first position.

In the normal, or first position, valve 57 interconnects the intake manifold 2 and fluid motor 84 for normal operation. When the accelerator pedal 15 is depressed it abuts upon plunger 70, forcing the latter down against the resistance of spring 71, causing movement of valve mechanism, as explained above. In the new position of the valve mechanism, auxiliary pump 56 is connected to the fluid motor. The vacuum created in the fluid motor is at this time due exclusively to pump 56. The pump created vacuum will continue only so long as the accelerator is depressed. When the accelerator pedal 15 is released, plunger 70 will again move upward, due to the force of spring 71 and will cause the return of the valve mechanism to its first position, inter-connecting intake manifold 2, and fluid motor 84 for normal operation. The plunger 70 consists of a female internally threaded member and a male externally threaded member for the purpose of adjusting the height of the plunger, in order to permit actuation of the valve mechanism at a predetermined depression of the accelerator pedal.

It may therefore be seen that by employing any of the embodiments of the instant invention, two sources of vacuum are provided; the first being susceptible of manual regulation to meet the needs of prevailing conditions, while the second is utilized to temporarily make the maximum vacuum attainable available to the wiper motor upon the existence of a transient need therefor. Further, the utilization of the high vacuum may be achieved without requiring the removal of either of the operator's hands from the steering wheel, or his eyes from the road.

Having thus disclosed exemplary embodiments of the invention, what is claimed is:

1. A windshield cleaner for automotive vehicles comprising, a fluid pressure motor, a wiper driven by the motor, and means for selectively varying the speed at which said wiper is driven by said motor including a manually operable control valve for regulating the magnitude of the vacuum normally made available to the motor, and auxiliary control valve means selectively operable to make a high vacuum available to the motor.

2. In combination with a vehicle engine having means including an accelerator pedal for the acceleration thereof, a wiper, fluid pressure motive means for the wiper, normal speed regulating means for the motive means, and means operable independently of said regulating means and automatically upon a predetermined movement of the accelerator pedal to by-pass said regulating means and permit the motive means to operate at maximum speed.

3. In combination with an automotive power plant having an intake manifold and an accelerator control pedal, a windshield cleaner having a wiper and a fluid motor connected to the wiper for actuating the same, a manually operable valve interposed between the manifold and the motor for regulating the normal speed of the wiper, and means operable automatically upon a predetermined movement of the accelerator control pedal for increasing the speed of wiper operation.

4. In combination with a vehicle engine having an accelerator pedal, a windshield cleaner comprising, a fluid motor, pressure fluid supply means for the motor, a wiper driven by the motor, primary control valve means for regulating the magnitude of the fluid pressure applied to the motor, and auxiliary control valve means operable automatically upon a predetermined movement of the accelerator pedal for by-passing said regulating valve means.

5. In combination with a vehicle engine having an intake manifold, and an accelerator pedal, a windshield clearing system comprising, a fluid pressure motor normally connected to the intake manifold, a wiper driven by the motor, a pump, and a valve connected to the pump and interposed between the intake manifold and the motor, said valve being operable automatically upon a predetermined movement of the accelerator pedal to connect the pump to the motor and disconnect the intake manifold therefrom.

6. A windshield cleaner comprising fluid pressure motive means, a wiper driven by the motive means, speed regulating means for the motive means, auxiliary means operable independently of said regulating means and which when activated by-pass said speed regulating means and permit the motive means to operate at high speed, and means to actuate the auxiliary means when a high speed of wiper operation is desired.

7. In combination with an automotive engine having an intake manifold and an accelerator control pedal, a windshield cleaner having a wiper and a fluid pressure motor connected to the wiper for actuating the same, a manually operable valve interposed between the manifold and the motor for regulating the speed of the wiper, an auxiliary pump driven by the engine, and means automatically operable upon a predetermined depression of the accelerator pedal for connecting the pump to the motor for wiper acceleration.

8. A fluid motor system comprising, a fluid pressure motor, a source of suction connected to the motor, a control valve interposed between the source and the motor for alternately connecting the source to opposite sides of the motor, a speed regulating valve for determining the magnitude of the vacuum created in the motor by the source, and means including an auxiliary valve for by-passing the speed regulating valve in order to permit the creation of a maximum vacuum in the motor for high speed operation.

9. A fluid motor system comprising, a fluid pressure motor, a source of suction connected to the motor, a control valve interposed between the source and the motor for alternately connecting the source to opposite sides of the motor, a speed regulating valve for determining the magnitude of the vacuum created in the motor by the source, and auxiliary speed regulating means including a rotatable auxiliary valve having a plurality of open and closed positions, said auxiliary valve when in open position providing a vacuum path by-passing the speed regulating valve for a higher speed of operation of the motor.

10. A fluid motor system as in claim 9 wherein the auxiliary valve is actuated by ratchet means.

11. In combination with a fluid pressure motor, means for connecting said motor to a source of pressure fluid including a casing having an inlet port, a main outlet port and an auxiliary outlet port, a spring loaded valve for selectively connecting the inlet port to the main outlet port for one speed of operation of said motor or to the auxiliary outlet port for a higher speed of motor operation, and spring loaded plunger means for actuating the valve.

12. In combination with a vehicle engine having an intake manifold, and an accelerator pedal, a windshield cleaning system comprising a fluid motor, a casing having an inlet port, a main outlet port and an auxiliary outlet port, said inlet port being connected to the motor and said main outlet port being connected to said manifold, a pump connected to said auxiliary outlet port, a valve normally interconnecting the inlet port and the main outlet port, and means changing the position of said valve upon a predetermined movement of the accelerator pedal so as to interconnect the inlet port and auxiliary outlet port.

13. A windshield cleaner comprising a wiper, a fluid motor connected to the wiper for oscillating the same, a control valve associated with the motor to regulate the normal speed of wiper operation, and transient high-speed operating means arranged in by-pass relation to said control valve for obtaining wiper speed faster than the regulated normal speed.

14. A windshield cleaner comprising a wiper, a fluid motor connected to the wiper for oscillating the same, a control valve associated with the motor to regulate the normal speed of wiper operation, and transient high-speed operating means connected to the motor independently of the control valve for supplying the motor more power to accelerate the wiper above the regulated normal speed.

15. A windshield cleaner for motor vehicles comprising a fluid pressure motor, a wiper driven by said motor, and means for selectively varying the speed at which said wiper is driven by said motor including a manually operable control valve for regulating the magnitude of the fluid pressure normally made available to said motor, and auxiliary control valve means selectively operable to make a high fluid pressure available to said motor.

References Cited in the file of this patent

UNITED STATES PATENTS

| | | |
|---|---|---|
| 1,244,686 | Bamford | Oct. 30, 1917 |
| 1,694,279 | Oishei | Dec. 4, 1928 |
| 2,293,542 | Hamilton | Aug. 18, 1942 |
| 2,557,534 | Cowles | June 19, 1951 |
| 2,702,918 | Neufeld | Mar. 1, 1955 |

FOREIGN PATENTS

| | | |
|---|---|---|
| 564,738 | Great Britain | Oct. 11, 1944 |